United States Patent
Kim et al.

(10) Patent No.: US 10,239,473 B2
(45) Date of Patent: Mar. 26, 2019

(54) WIRING GUIDE OF VEHICLE DOOR

(71) Applicants: HYUNDAI MOTOR COMPANY, Seoul (KR); KIA MOTORS CORPORATION, Seoul (KR)

(72) Inventors: Hyong-Don Kim, Incheon (KR); Yong-Hyun Nam, Gunpo-si (KR); Jeong-Hyeon Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/835,099

(22) Filed: Dec. 7, 2017

(65) Prior Publication Data

US 2019/0047491 A1 Feb. 14, 2019

(30) Foreign Application Priority Data

Aug. 14, 2017 (KR) ........................ 10-2017-0103021

(51) Int. Cl.
*B60R 16/02* (2006.01)
*H02G 3/04* (2006.01)
*B60J 5/04* (2006.01)

(52) U.S. Cl.
CPC ......... *B60R 16/0215* (2013.01); *B60J 5/0473* (2013.01); *H02G 3/0481* (2013.01)

(58) Field of Classification Search
CPC ... B60R 16/0215; B60J 5/0473; H02G 3/0481
USPC ....................................................... 174/72 A
See application file for complete search history.

(56) References Cited

U.S. PATENT DOCUMENTS

| 263,966 | A | * | 3/1954 | Larkin | .............................. 339/7 |
| 3,879,895 | A | * | 4/1975 | Hinderks | .............. B60R 13/043 |
| | | | | | 49/462 |
| 7,042,738 | B2 | * | 5/2006 | Tsubaki | ............. B60R 16/0215 |
| | | | | | 174/72 A |
| 8,091,949 | B2 | | 1/2012 | Toyozumi et al. | |
| 9,340,169 | B2 | | 5/2016 | Froese | |
| 9,944,238 | B2 | * | 4/2018 | Ma | ...................... B60R 16/0215 |
| 2004/0017648 | A1 | * | 1/2004 | Tsubaki | ............. B60R 16/0215 |
| | | | | | 361/601 |
| 2010/0108377 | A1 | * | 5/2010 | Terada | ................ B60R 16/0215 |
| | | | | | 174/72 A |

(Continued)

FOREIGN PATENT DOCUMENTS

| JP | 2006-347282 A | 12/2006 |
| KR | 20-0426014 Y1 | 9/2006 |
| KR | 10-2009-0080555 A | 7/2009 |

*Primary Examiner* — Timothy Thompson
*Assistant Examiner* — Michael F McAllister
(74) *Attorney, Agent, or Firm* — Morgan Lewis & Bockius LLP

(57) ABSTRACT

A wiring guide of a vehicle door includes: an outside guide slidably disposed on one of a vehicle body and a door of a vehicle, and having an inner portion which has a hollow and circular arc shape; and an inside guide slidably disposed on the other side of the vehicle body and the vehicle door, having an inner portion which has a hollow and circular arc shape, slidably disposed in the inner portion of the outside guide, and having a wiring penetrating therein. The outside guide and the inside guide expand and shrink in a circular arc shape upon opening and closing of the door.

15 Claims, 15 Drawing Sheets

(56) References Cited

U.S. PATENT DOCUMENTS

2014/0063245 A1* 3/2014 Bowers ................ B60R 1/0607
348/148

* cited by examiner

- Prior Art -

- Prior Art -

WIRING GUIDE OF VEHICLE DOOR

CROSS-REFERENCE TO RELATED APPLICATIONS

This application claims the benefit of priority to Korean Patent Application No. 10-2017-0103021, filed on Aug. 14, 2017, which is incorporated herein by reference in its entirety.

TECHNICAL FIELD

The present disclosure relates to a wiring guide of a vehicle door capable of receiving a wiring connected between a vehicle body and a door upon opening and closing of the vehicle door, thereby reducing phenomenon that the wiring interferes upon opening and closing of the door.

BACKGROUND

A door installed on a vehicle maintains a state fastened to a vehicle body during a vehicle driving to protect a passenger inside the vehicle; and it is opened upon getting on/off of the passenger, and thus the passenger can get on/off it.

Generally, in a swing type door mainly applied to the vehicle, one side of the door is hinge-connected to the vehicle body to be mounted to the vehicle body, and thus it is opened and closed while rotating around the hinge-connected portion.

That is, as illustrated in FIG. 1, a vehicle body 110 and a door 120 are hinge-connected to each other through a hinge shaft (L-L) perpendicular to the ground, and the door 120 rotates toward a side of the vehicle body 110 to be opened and closed.

In this case, the vehicle body 110 and the door 120 are installed with a wiring (W) for operating various types of a switch, a driving motor, a speaker, a lamp and the like mounted to the door 120. For example, by piercing a side outer 111 of the vehicle body 110 and one side of an inner panel 121 of the door 120, the wiring (W) can be penetrated, and a wiring tube 130 for storing the wiring (W) is installed on an outside thereof.

Since the swing type door 120 is formed with the wiring (W) at the location not away from the hinge shaft (L-L) upon opening and closing of the door 120, the wiring (W) upon opening and closing of the door is slightly bent or slightly deformed. That is, since the wiring tube 130 has a small amount of deformation such as 130', deformation of the wiring (W) is also slight.

Among the vehicle doors, as illustrated in FIG. 2, there is a butterfly door 220 that a vehicle body and a door are hinge-connected at an A-pillar of the vehicle. In the butterfly door 220, the hinge shaft (L-L) has the direction approximately paralleling with the A-pillar.

Although the butterfly door 220 should be positioned so that the wiring (W) for operating a switch, a driving motor, a speaker, a lamp and the like installed on the door 220 is adjacent to the hinge shaft (L-L), it is structurally difficult to obtain enough space for installing the wiring (W) on the A-pillar.

The path of the wiring (W) should be configured to pass through an inner panel 221 of the door 220 and then to pass through a side outer 211 of a vehicle body 210, and in this case, the wiring (W) has no choice but to be away from the hinge shaft (L-L) upon opening of the butterfly door 220.

As such, if the wiring (W) is away from the hinge shaft (L-L), deformation of the wiring (W) and a wiring tube 230 covering the wiring (W) upon opening and closing of the butterfly door 220 cannot be controlled. Upon opening and closing of the butterfly door 220, if deformation of the wiring (W) and the wiring tube 230 covering the wiring (W) cannot be controlled upon opening and closing of the butterfly door 220, the wiring (W) and the wiring tube 230 upon opening and closing of the butterfly door 220 can be deformed as the unintended shape (e.g., the shape like 230') between the butterfly door 220 and the vehicle body 210, the wiring (W) can be bent to be broken, and in some cases, it can be inserted between the butterfly door 220 and the vehicle body 210 to be damaged.

Further, upon opening of the butterfly door 220, the wiring tube 230 covering the wiring (W) has been lengthily exposed, which brings an aesthetic disadvantage.

Other than the vehicle with the butterfly door mounted, the problem also occurs in all vehicles with the door vertically hinged, such as a scissor door and the like.

The contents described in the Background are to help the understanding of the background of the present disclosure, and may include what is not previously known to those skilled in the art to which the present disclosure pertains.

SUMMARY OF THE DISCLOSURE

Other objects and advantages of the present disclosure can be understood by the following description, and become apparent with reference to the embodiments of the present disclosure. It is obvious to those skilled in the art to which the present disclosure pertains that the objects and advantages of the present disclosure can be realized by the means as claimed and combinations thereof.

The present disclosure is proposed for solving the above problems, and the object of the present disclosure is to provide a wiring guide of a vehicle door that in the vehicle in which a vertically-hinged door is installed, such as a butterfly door, in order for a wiring installed between the vehicle body and the door of the vehicle to control deformation of the wiring upon opening and closing of the door, the wiring can be installed in a circular arc shape that is around a hinge shaft of the door.

A wiring guide of a vehicle door according to an exemplary embodiment of the present disclosure includes: an outside guide slidably disposed on one of a vehicle body and a door of a vehicle, and having an inner portion which has a hollow and circular arc shape; and an inside guide slidably disposed on the other side of the vehicle body and the door of the vehicle, having an inner portion which has a hollow and circular arc shape, slidably disposed in an inner portion of the outside guide, and having the wiring penetrating therein. The outside guide and the inside guide expand and shrink in a circular arc shape upon opening and closing of the door.

The outside guide and the inside guide are formed, respectively, in a circular arc shape that is around a hinge shaft being a rotation center of the door.

The outside guide is installed on the vehicle body side, and the inside guide is installed on the door side.

The outside guide is inserted into a through-hole formed on a side outer of the vehicle body to be slidably installed, and the inside guide is inserted into a through-hole formed on an inner panel of the door to be slidably installed.

A fixing holder that the inside guide penetrates is installed in the inner panel of the door.

An end portion of the inside guide is fixed to the fixing holder.

Among both ends of the inside guide, if the inside guide maximally comes out from the outside guide, an end portion adjacent to the fixing holder is fixed to the fixing holder.

A guide fixing case that the outside guide penetrates is installed on the side outer of the vehicle body.

The outside guide is slidably installed on the guide fixing case.

A track inducing device inducing a track of the inside guide with respect to the outside guide is formed on the outside guide and the inside guide.

The track inducing device includes a guiding protrusion formed on an outside surface of the inside guide along a longitudinal direction of the inside guide, and a guiding groove formed on an inner surface of the outside guide and receiving the guiding protrusion.

A guiding device guiding the outside guide with respect to the guide fixing case is interposed between an outside surface of the outside guide and the guide fixing case.

The guiding device includes an inserting groove formed on an end portion of the outside guide, and an inserting protrusion formed on an end portion of the guide fixing case, and into which the inserting groove is inserted if the door is maximally opened.

An outer diameter of the inside guide is formed to be smaller than an inner diameter of the outside guide.

The door is a vertically-opened door vertically opened.

The door is a butterfly door.

According to the wiring guide of the vehicle door of the present disclosure having the above configuration, upon opening and closing of the butterfly door, the inside case and the outside case slide in a circular arc shape that is around the hinge shaft of the door, and thus deformation of the wiring installed for connecting the door and the vehicle body can be controlled.

Since the wiring is positioned inside the wiring guide, phenomenon that upon opening and closing of the door, the wiring is bent or is deformed as the unintended shape can be prevented.

Further, since the wiring guide maintains a constant shape that is not a wiring tube that it is difficult for the wiring to maintain a constant shape, the effect improving its appearance upon opening of the door can be obtained.

BRIEF DESCRIPTION OF THE DRAWINGS

FIG. 9A illustrates the state upon opening of the door, and FIGS. 9B to 9D are perspective views illustrating the states upon closing of the door.

FIG. 10A is a perspective view illustrating the state upon closing of the door viewed from inside the vehicle, FIG. 10B is a perspective view illustrating the state upon partially-opening of the door viewed from inside the vehicle, and FIG. 10C is a perspective view illustrating the state upon opening of the door viewed from inside the vehicle.

DESCRIPTION OF SPECIFIC EMBODIMENTS

Figure 1:
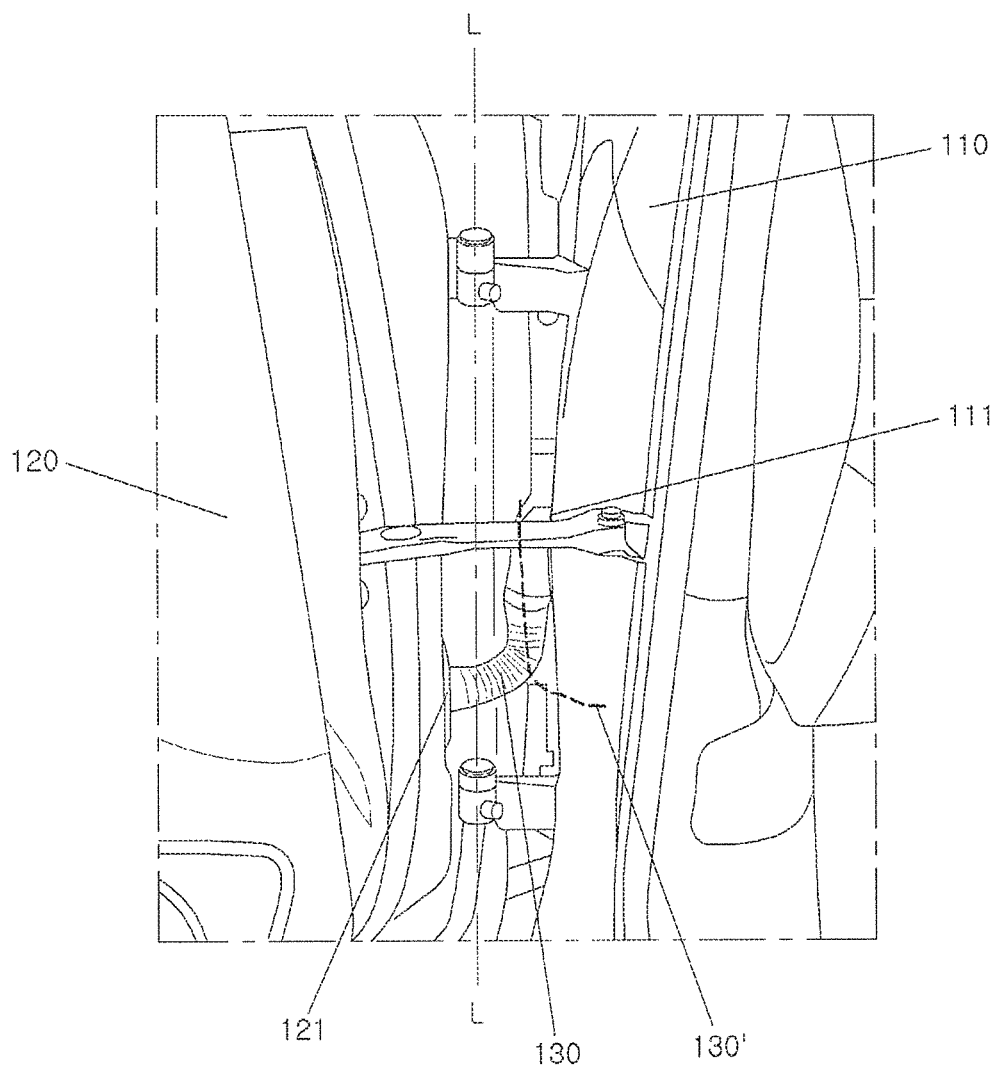
FIG. 1 is a perspective view illustrating a state of a wiring and a wiring tube upon opening of a swing type door.
Figure 2:
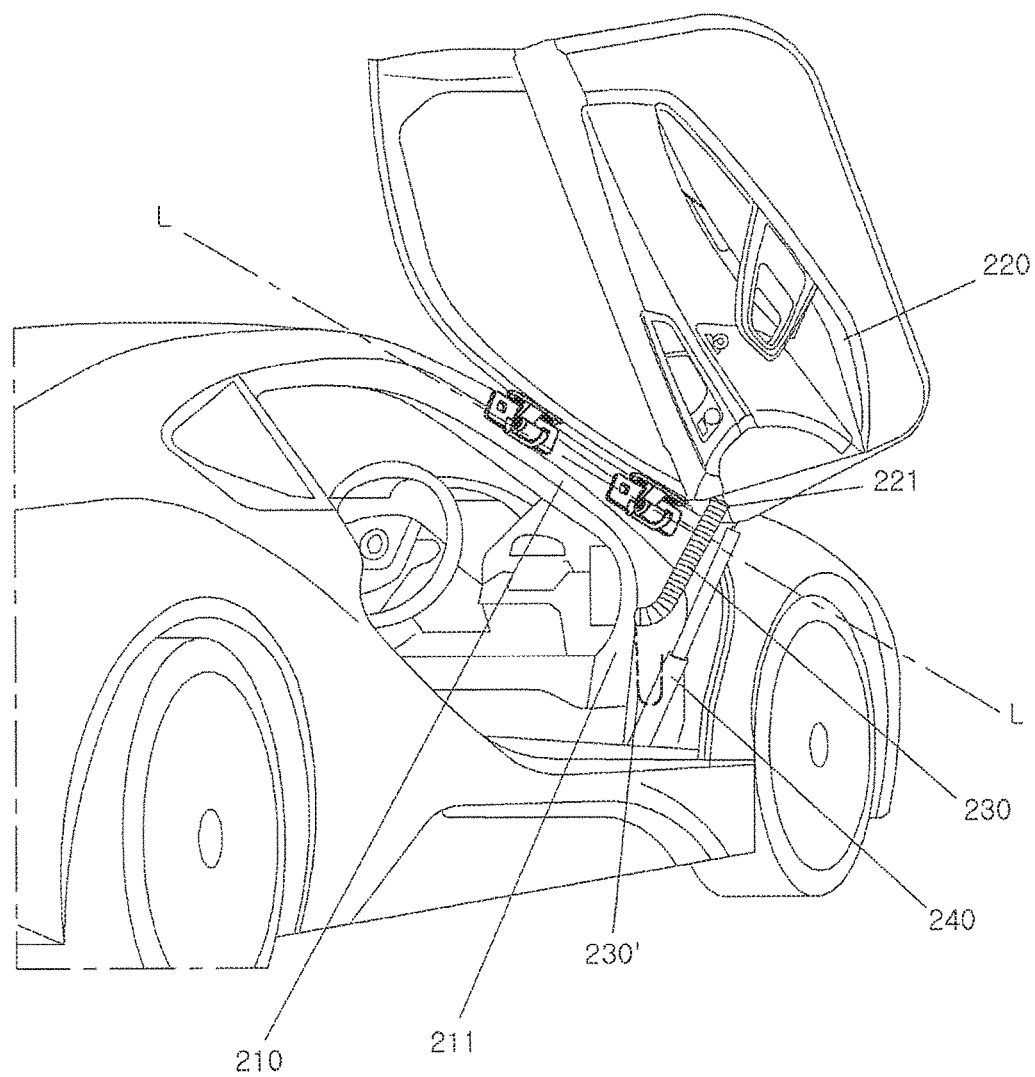
FIG. 2 is a perspective view illustrating a state of a wiring and a wiring tube upon opening of a butterfly door according to the related art.
Figure 3:
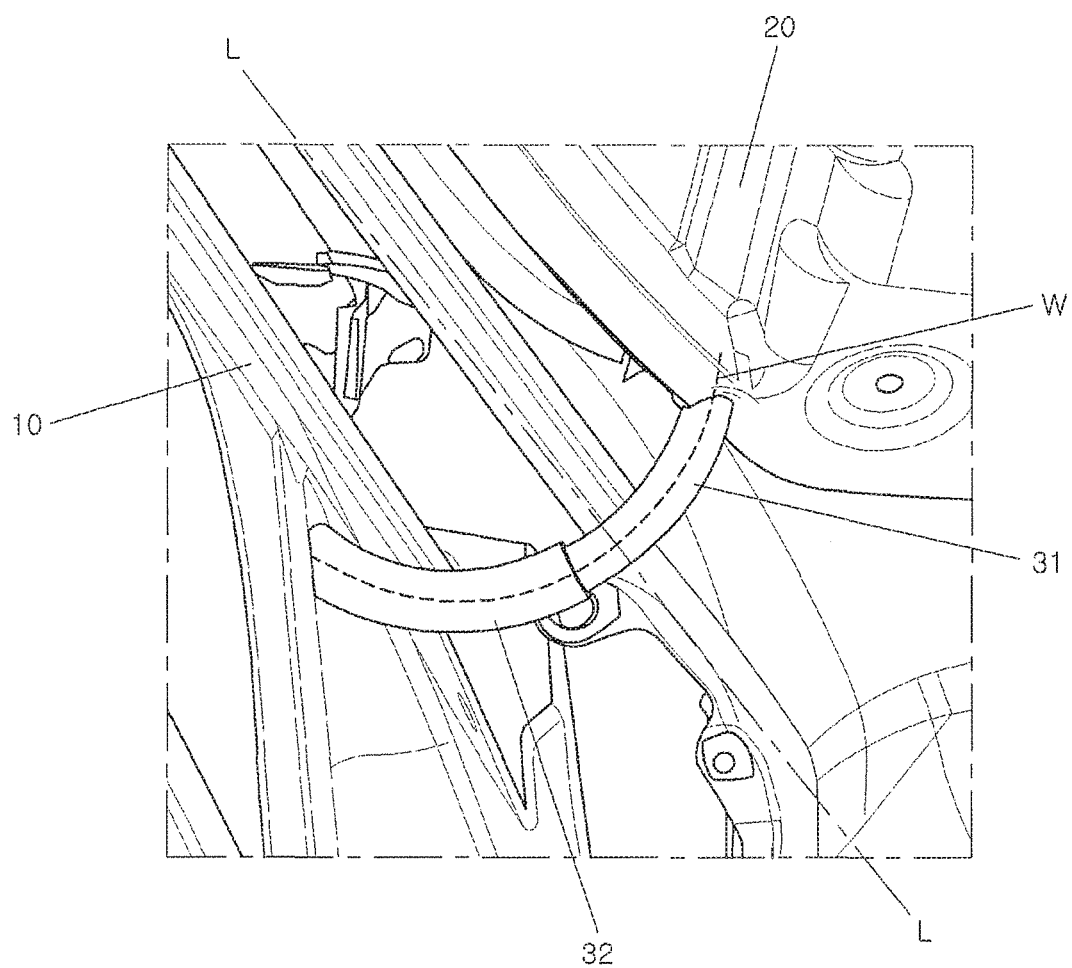
FIG. 3 is a perspective view illustrating a state upon opening of the door in a vehicle applied with the wiring guide of the vehicle door according to the present disclosure.
Figure 4:
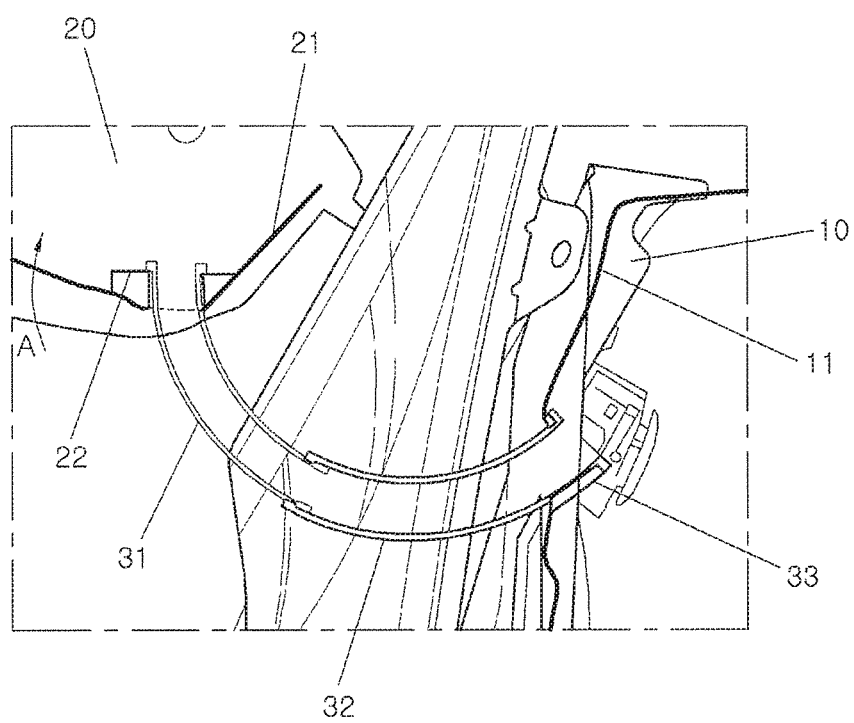
FIG. 4 is a cross-sectional view illustrating a state upon opening of the door in the vehicle applied with the wiring guide of the vehicle door according to the present disclosure.
Figure 5:
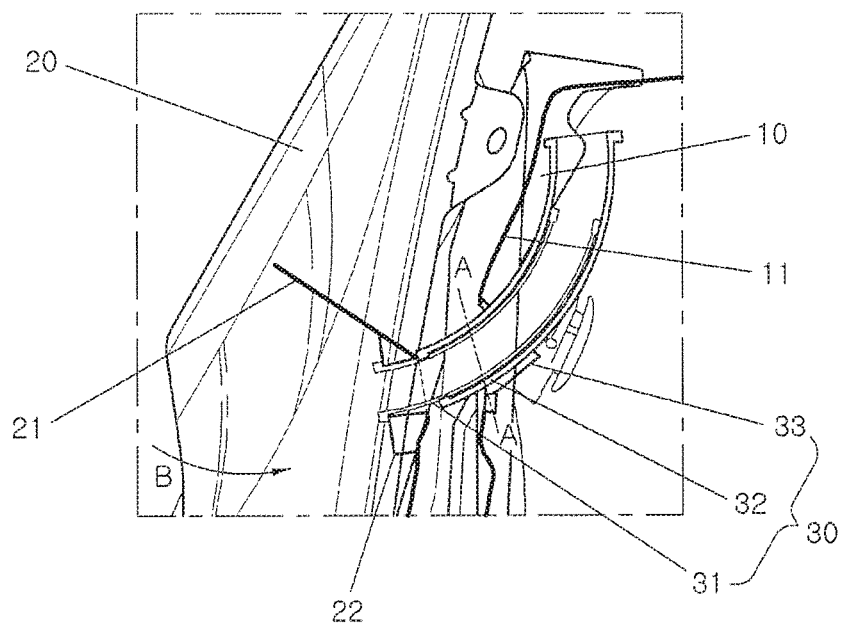
FIG. 5 is a cross-sectional view illustrating a state upon closing of the door in the vehicle applied with the wiring guide of the vehicle door according to the present disclosure.

Reference should be made to the accompanying drawings that illustrate preferred embodiments of the present disclosure, and to the description in the accompanying drawings in order to fully understand the present disclosure, operational advantages of the present disclosure, and objects attained by practicing the present disclosure.

In certain embodiments, known technologies or detailed descriptions may be reduced or omitted to avoid obscuring appreciation of the disclosure by those skilled in the art.

Hereinafter, a wiring guide of a vehicle door according to the present disclosure will be described in detail with reference to the accompanying drawings.

The wiring guide of the vehicle door according to the present disclosure includes: an outside guide 32 slidably installed on any one side of a vehicle body 10 and a door 20 of a vehicle, and with an inner portion thereof formed in a hollow and circular are shape; and an inside guide 31 slidably installed on the other side of the vehicle body 10 and the door 20 of the vehicle, with an inner portion thereof formed in a hollow and circular arc shape, and slidably installed in the inner portion of the outside guide 32; and the outside guide 32 and the inside guide 31 are expanded and shrinked in a circular arc shape upon opening and closing of the door 20.

Inner portions of the outside guide 32 and the inside guide 31 have a hollow and circular arc shape, respectively. The inside guide 31 is inserted into the inner portion of the outside guide 32, and as the inside guide 31 and the outside guide 32 are expanded and shrinked upon opening and closing of a vertically-hinged door, such as the butterfly door 20, the wiring (W) connecting the vehicle body 10 and the door 20 is covered.

The outside guide 32 is selectively installed on any one side of the vehicle body 10 and the door 20 of the vehicle, and the inside guide 31 is installed on the other side of the vehicle body 10 and the door 20 of the vehicle. For example, as illustrated in the drawing, the outside guide 32 forms a through-hole on a side outer 11 of the vehicle body 10 to be slidably installed, and the inside guide 31 forms a through-hole on an inner panel 21 of the door 20 to be slidably installed.

The outside guide 32 can be installed on the door 20, and the inside guide 31 can be also installed on the vehicle body 10.

The wiring (W) passes through the inner portions of the outside guide 32 and the inside guide 31 to operate a switch, a driving motor, a speaker, a lamp and the like installed on the door 20.

The outside guide 32 and the inside guide 31 have a circular arc shape, and the outside guide 32 and the inside guide 31 have a circular arc shape that is around the hinge shaft (L-L) being a rotation center of the door 20. As such, the outside guide 32 and the inside guide 31 have a circular arc shape having the same center as that of the hinge shaft (L-L) to be slided, and thus bending and deformation of the wiring (W) can be resolved.

Figure 7:
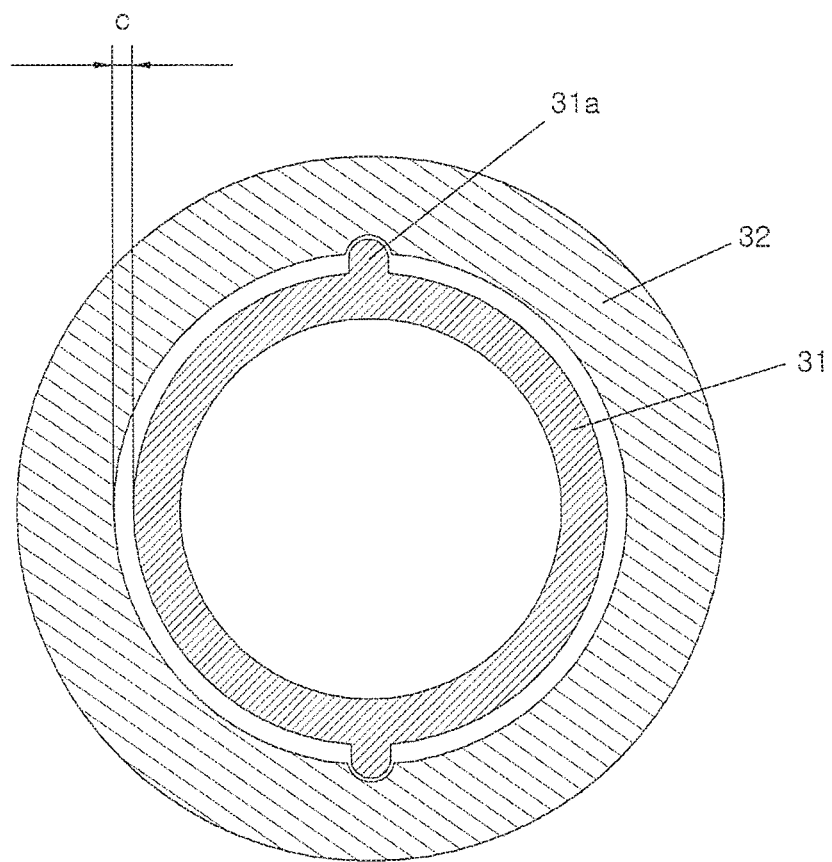
FIG. 7 is a cross-sectional view taken on line A-A of FIG. 5.

In this case, an outer diameter of the inside guide 31 can be formed to be smaller than an inner diameter of the outside guide 32. As illustrated in FIG. 7, the outer diameter of the inside guide 31 is formed to be smaller than the inner diameter of the outside guide 32 to form a gap (c) therebetween, and thus if the inside guide 31 slides inside the outside guide 32, friction occurring between an outside surface of the inside guide 31 and an inside surface of the outside guide 32 is reduced.

The outside guide 32 and the inside guide 31 may be slidably formed on the vehicle body 10 and the door 20, and an installation for supporting them is formed thereon.

The outside guide 32 forms a through-hole on the side outer 11 of the vehicle body 10, installs a guide fixing case 33 formed in a circular arc shape on the through-hole, and then the outside guide 32 is slidably installed in an inner portion of the guide fixing case 33.

Further, the inside guide 31 forms a through-hole in the inner panel 21 of the door 20, installs a fixing holder 22 on the through-hole, and then the inside guide 31 is slidably installed on the fixing holder 22.

In this case, an end portion of the inside guide 31 is fixed to the fixing holder 22. That is, among both ends of the inside guide 31, if the inside guide 31 maximally comes out from the outside guide 32, an end portion adjacent to the fixing holder 22 in the inside guide 31 is fixed to the fixing holder 22. The inside guide 31 is fixed to the fixing holder 22, and thus as the inside guide 31 slides, noise caused by hitting on the panel of the door can be prevented.

The outside guide 32 is slidably installed on the guide fixing case 33, and thus upon closing of the door, the outside guide 32 is inserted into an inner portion of the vehicle body through the guide fixing case 33; and upon opening of the door, the outside guide 32 comes out from the vehicle body through the guide fixing case 33.

The outside guide 32 and the inside guide 31 can maintain a moving track by the guide fixing case 33 and the fixing holder 22.

A track inducing device guiding a track upon sliding of the outside guide 32 and the inside guide 31 may be interposed between the outside guide 32 and the inside guide 31.

Figure 6:
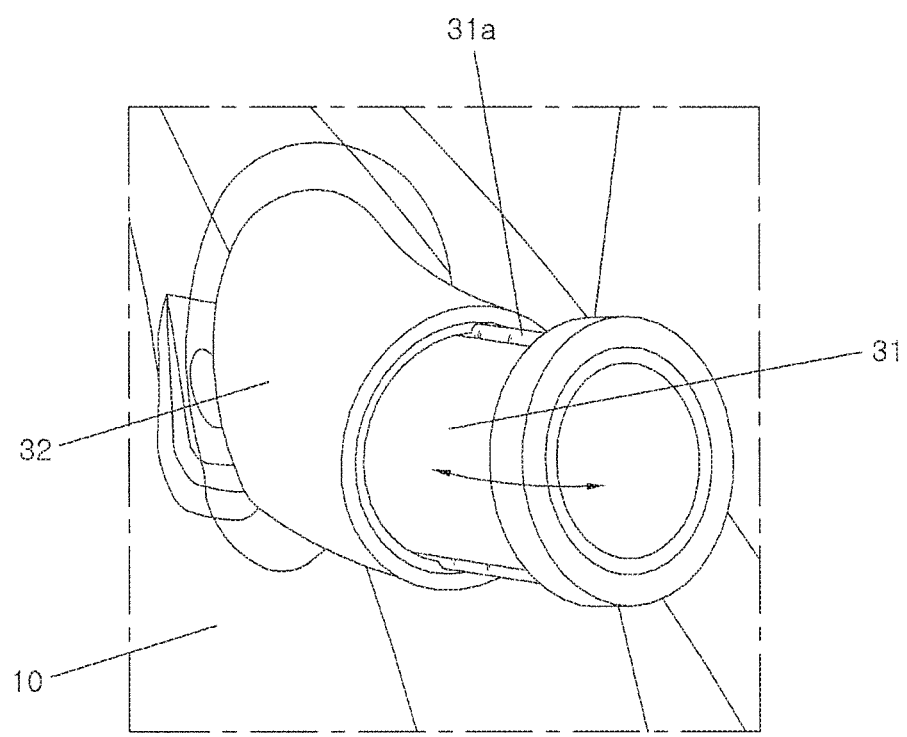
FIG. 6 is a perspective view illustrating a state that an inside guide is installed on an outside guide in the wiring guide of the vehicle door according to the present disclosure.
Figure 8:
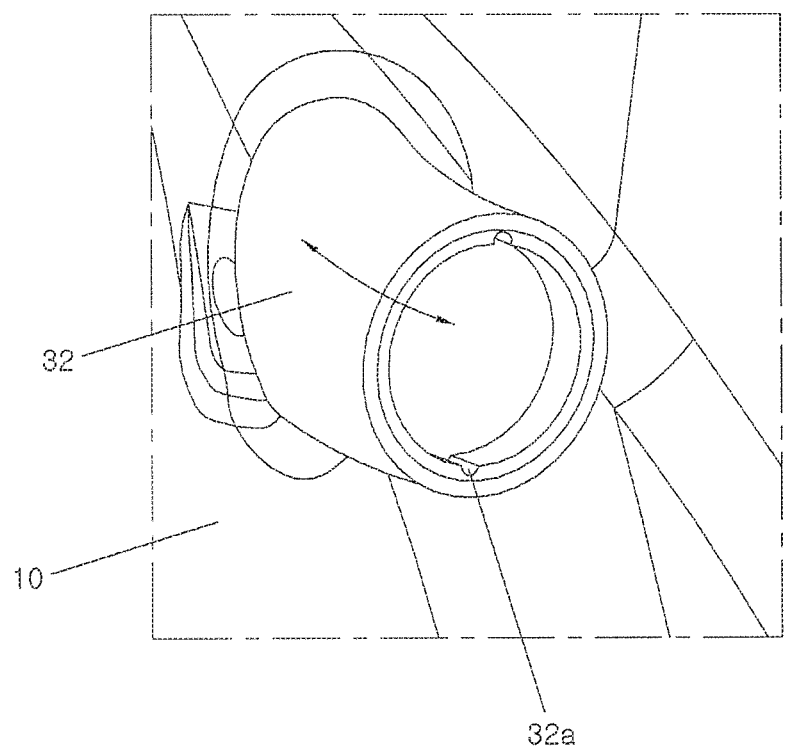
FIG. 8 is a perspective view illustrating a state that the outside guide is installed on a side outer of the vehicle in the wiring guide of the vehicle door according to the present disclosure.

As a detail example of the track inducing device, as illustrated in FIGS. 6 to 8, a guiding protrusion 31a formed on the outside surface of the inside guide 31 along the longitudinal direction of the inside guide 31, and a guiding groove 32a receiving the guiding protrusion 31a on the inside surface of the outside guide 32 can be formed.

Accordingly, if the inside guide 31 slides on the outside guide 32, it slides in a state that the guiding protrusion 31a is received in the guiding groove 32a to thus secure its location when the inside guide 31 slides in the outside guide 32.

Particularly, since there is a gap between the outside surface of the inside guide 31 and the inside surface of the outside guide 32, if the inside guide 31 and the outside guide 32 slide each other, the rotation in a circumferential direction can be caused, and they can slide only in the longitudinal direction by the guiding protrusion 31a and the guiding groove 32a.

Meanwhile, in the track inducing device, the guiding groove can be formed on the outside surface of the inside guide 31, and the guiding protrusion can be formed on the inside surface of the outside guide 32.

Further, the groove-protrusion structure can be also applied between the outside guide 32 and the guide fixing case 33 to guide the outside guide 32 with respect to the guide fixing case 33. An inserting groove 32b and an inserting protrusion 33a are formed on the outside guide 32 and the guide fixing case 33, respectively; if the door 20 is maximally opened, the outside guide 32 and the guide fixing case 33 make the inserting groove 32b and the inserting protrusion 33a coupled (referring to FIG. 9A), and in the other case (referring to FIGS. 9B to 9D), make the inserting groove 32b of the outside guide 32 and the inserting protrusion 33a of the guide fixing case 33 spaced.

Further, each of both ends of the inside guide 31 outwardly protrudes to an outside thereof to be formed in order to prevent the inside guide 31 from being escaped from the fixing holder 22 and the outside guide 32. One end of the outside guide 32 is protruded to and formed on the inside surface of the outside guide 32 in order not to be separate from the inside guide 31, and the other end of the outside guide 32 is protruded to and formed on the outside of the outside guide 32 in order not to be escaped from the guide fixing case 33.

Operation of the wiring guide of the vehicle door according to the present disclosure having the above configuration will be described.

Figure 9A:
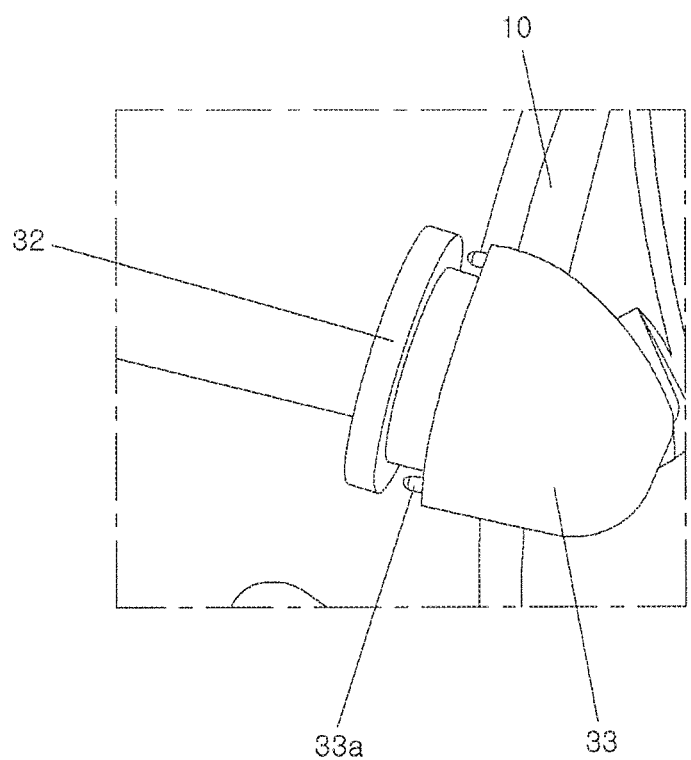
FIGS. 9A to 9D are perspective views illustrating states of the outside guide and the guide fixing case upon opening from closing of the door in the wiring guide of the vehicle door according to the present disclosure.
Figure 9B:
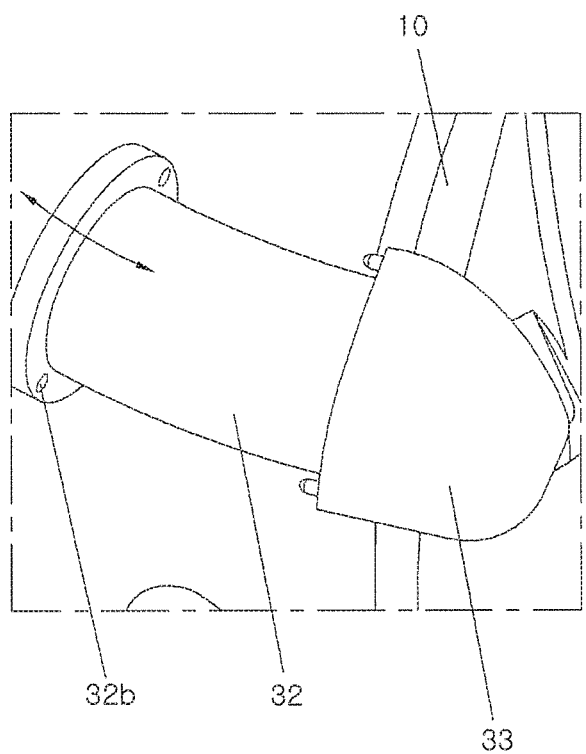
Figure 9C:
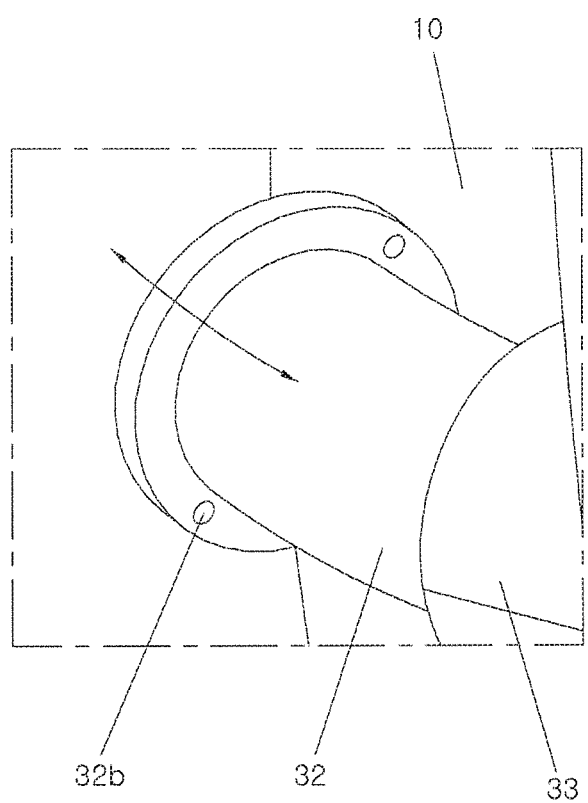
Figure 9D:
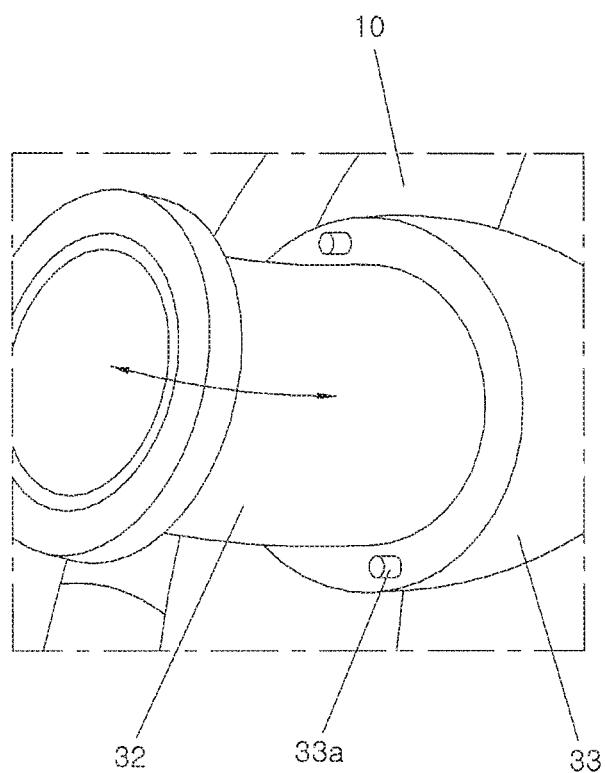
Figure 10A:
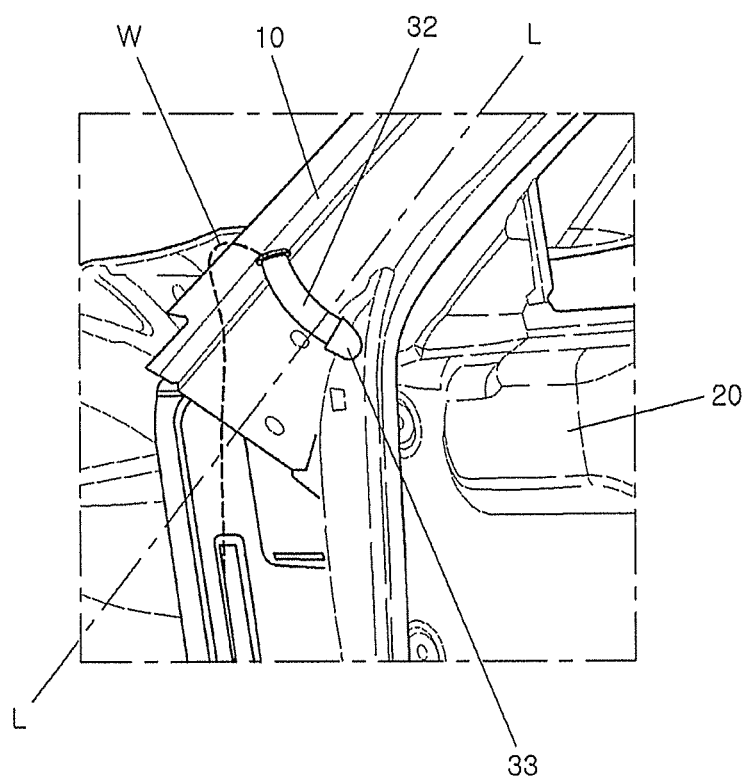
FIGS. 10A to 10C are perspective views illustrating operating states of the wiring guide of the vehicle door according to the present disclosure.
Figure 10B:
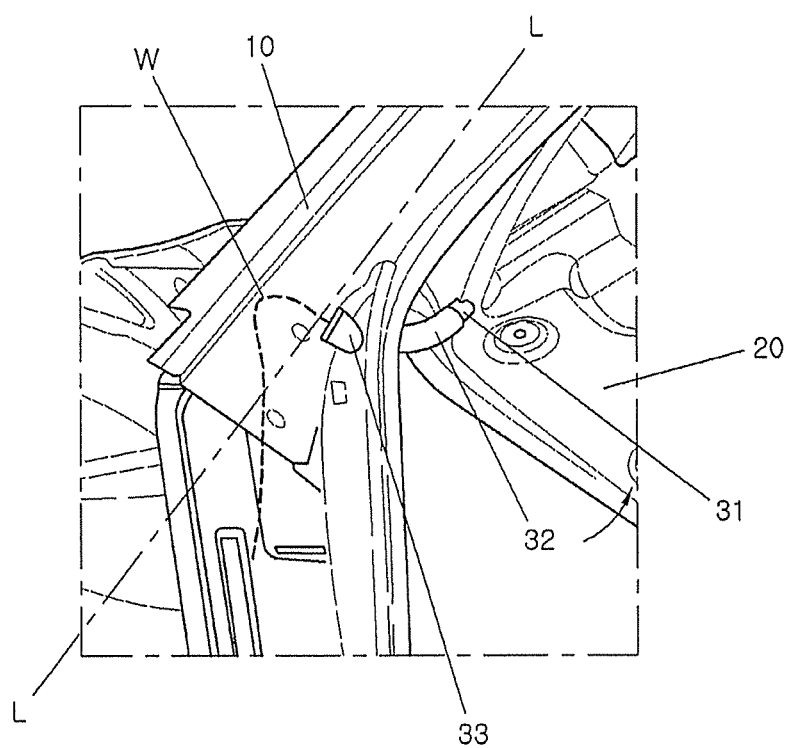
Figure 10C:
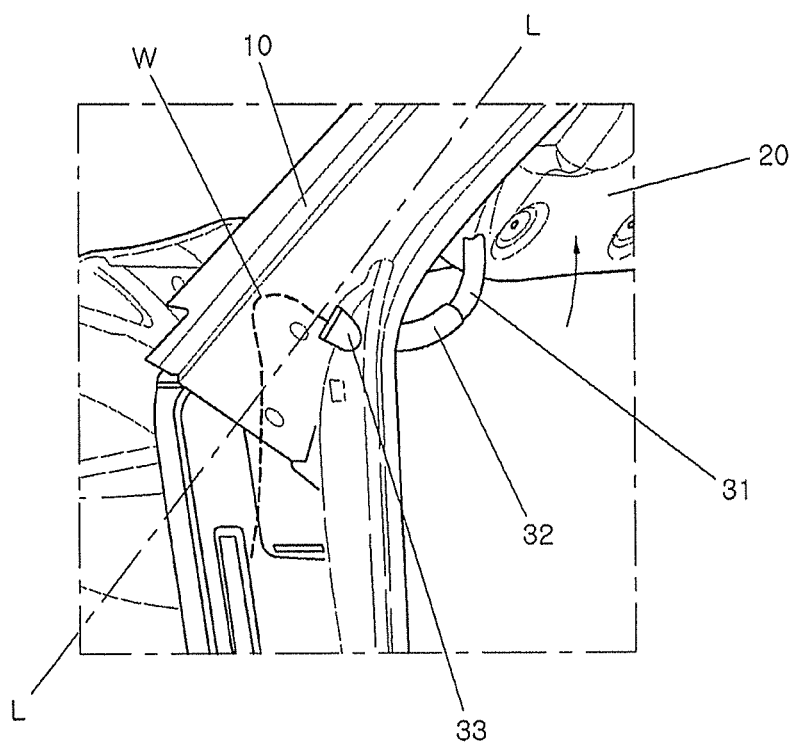

FIGS. 9A TO 9C illustrate a closed state of the butterfly door 20 (FIG. 9A), a partially opened state (FIG. 9B), and a maximally opened state (FIG. 9C).

In a state that the butterfly door 20 is closed, the inside guide 31 is all inserted into the outside guide 32, and the outside guide 32 is also all inserted into the guide fixing case 33.

If the butterfly door 20 begins to be opened, the outside guide 32 comes out from the guide fixing case 33, and the inside guide 31 also begins to come out from the outside guide 32.

Next, if the butterfly door 20 is maximally opened, the outside guide 32 maximally comes out from the guide fixing case 33, and the inside guide 31 also maximally comes out from the outside guide 32.

Upon closing of the door, contrary to the above, the inside guide 31 is inserted into the outside guide 32, and the outside guide 32 is inserted into the guide fixing case 33.

In this case, the wiring (W) is positioned in the inner portions of the outside guide 32 and the inside guide 31, and since the outside guide 32 and the inside guide 31 are expanded and shrinked in a circular arc shape that is around the hinge shaft (L-L), phenomenon that the wiring (W) is bent or deformed as the unwanted shape can be prevented.

While the present disclosure has been described with respect to the specific embodiments, it will be apparent to those skilled in the art that various changes and modifications may be made without departing from the spirit and scope of the disclosure as defined in the following claims.

What is claimed is:

1. A wiring guide of a vehicle door, the wiring guide comprising:

an outside guide slidably disposed on a vehicle body or the vehicle door, the outside guide having an inner portion which has a hollow and circular arc shape; and an inside guide slidably disposed on the other of the vehicle body and the vehicle door, having an inner portion which has a hollow and circular arc shape, slidably disposed in the inner portion of the outside guide, and having a wire penetrating through the inside guide, wherein the outside guide and the inside guide expand and shrink in a circular arc shape while opening and closing of the vehicle door, and wherein further comprising a track inducing device for inducing a track of the inside guide with respect to the outside guide is disposed on the outside guide and the inside guide.

2. The wiring guide of claim 1, wherein the outside guide and the inside guide have, respectively, a circular arc shape around a hinge shaft which is a rotational center of the vehicle door.

3. The wiring guide of claim 2, wherein the outside guide is disposed on a vehicle body side, and the inside guide is installed on a vehicle door side.

4. The wiring guide of claim 3, wherein the outside guide is inserted into a through-hole of an outer side of the vehicle body, and the inside guide is inserted into a through-hole of an inner panel of the vehicle door.

5. The wiring guide of claim 4, further comprising a fixing holder, through which the inside guide penetrates, in the inner panel of the vehicle door.

6. The wiring guide of claim 5, wherein an end portion of the inside guide.

7. The wiring guide of claim 6, wherein when the inside guide is out of the outside guide, one end portion, which is adjacent to the fixing holder, among both ends of the inside guide is fixed to the fixing holder.

8. The wiring guide of claim 4, wherein a guide fixing case, through which the outside guide penetrates, is disposed on the outer side of the vehicle body.

9. The wiring guide of claim 8, wherein the outside guide is slidably disposed on the guide fixing case.

10. The wiring guide of claim 1, wherein the track inducing device comprises:

a guiding protrusion disposed on an outside surface of the inside guide along a longitudinal direction of the inside guide, and a guiding groove disposed on an inner surface of the outside guide and receiving the guiding protrusion.

11. The wiring guide of claim 8, further comprising a guiding device for guiding the outside guide with respect to the guide fixing case is interposed between an outside surface of the outside guide and the guide fixing case.

12. The wiring guide of claim 11, wherein the guiding device comprises:

an inserting groove disposed on an end portion of the outside guide, and an inserting protrusion disposed on an end portion of the guide fixing case, and into which the inserting groove is inserted when the vehicle door is opened.

13. The wiring guide of claim 1, wherein an outer diameter of the inside guide is smaller than an inner diameter of the outside guide.

14. The wiring guide of claim 1, wherein the vehicle door is a vertically-opened door.

15. The wiring guide of claim 14, wherein the vehicle door is a butterfly door.

* * * * *